United States Patent
Patel et al.

(10) Patent No.: US 11,181,987 B2
(45) Date of Patent: Nov. 23, 2021

(54) VISION SENSOR SYSTEM

(71) Applicant: MOTHERSON INNOVATIONS COMPANY LIMITED, London (GB)

(72) Inventors: Mukesh Patel, Stuttgart (DE); Geon Young Choi, Chungcheongbuk-do (KR)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/159,993

(22) Filed: Jan. 27, 2021

(65) Prior Publication Data

US 2021/0232229 A1    Jul. 29, 2021

(30) Foreign Application Priority Data

Jan. 28, 2020  (DE) ..................... 10 2020 101 957.2

(51) Int. Cl.
  *G06F 3/01* (2006.01)
  *G06F 3/044* (2006.01)
  *G06F 3/03* (2006.01)

(52) U.S. Cl.
  CPC ............ *G06F 3/017* (2013.01); *G06F 3/0325* (2013.01); *G06F 3/044* (2013.01)

(58) Field of Classification Search
  CPC ......... G06F 3/017; G06F 3/0325; G06F 3/044
  See application file for complete search history.

(56) References Cited

U.S. PATENT DOCUMENTS

| | | |
|---|---|---|
| 10,514,772 B1 | 12/2019 | Wang et al. |
| 2014/0292658 A1 | 10/2014 | Lee et al. |
| 2016/0059773 A1 | 3/2016 | Evans et al. |
| 2018/0068609 A1 | 3/2018 | Yamazaki et al. |
| 2019/0197970 A1 | 6/2019 | Staton et al. |

FOREIGN PATENT DOCUMENTS

| | | |
|---|---|---|
| DE | 102017218516 A1 | 4/2019 |
| WO | WO 2018/167096 A1 | 9/2018 |

OTHER PUBLICATIONS

German Office Action dated Oct. 20, 2020 of German application No. DE 10 2020 101 957.2.

*Primary Examiner* — Michael Pervan
(74) *Attorney, Agent, or Firm* — Jones Day

(57) ABSTRACT

A vision sensor system is used for gesture recognition or another control system with a human-machine interface. In the vision sensor system, a vision sensor 1 is used in particular to check the presence, the orientation, the characteristics or the texture of an object 15. For this purpose, the vision sensor 1 has a housing 2 in which a light-receiving element 3 is arranged. At a distance from the light-receiving element 3 there is a cover made of a translucent carrier material 5 with a first surface 6 facing the light-receiving element 3 and a second surface 7 facing away from the light-receiving element 3, both located in the beam path 4 of the light-receiving element 3. The carrier material 5 has at least partially a translucent metallic coating 8, 9 on at least one of the first or second surfaces 6, 7 located in the beam path 4 of the light receiving element 3.

12 Claims, 3 Drawing Sheets

VISION SENSOR SYSTEM

CROSS-REFERENCE TO RELATED APPLICATION

This application claims the benefit of foreign priority to German Patent Application No. DE 10 2020 101 957.2, filed Jan. 28, 2020, which is hereby incorporated by reference in its entirety for all purposes.

BACKGROUND

1. Field of the Invention

The invention concerns a vision sensor system, such as is used for gesture recognition or another control system with a human-machine interface. In the vision sensor system, a vision sensor is used in particular to recognize the presence, the orientation, the characteristics or the nature of an object, in particular by image comparison. For this purpose, the vision sensor has a housing in which a light-receiving element is arranged. At a distance from the light-receiving element there is a cover of a translucent carrier material with a first surface facing the light-receiving element and located in the beam path of the light-receiving element and a second surface facing away from the light-receiving element and located in the beam path of the light-receiving element.

2. Related Art

From the WO2019/048764, a touch-sensitive touchpad mounted on the steering wheel of a vehicle for capturing digital and/or tactile gestures by means of a standard camera arranged on a dashboard or more generally an image sensor for finger recognition and a light source is known. For this purpose, the touchpad is light-transmissive at least to infrared light and has an elastic deformable seal which is generally absorbent in the integrating optical wavelengths. The touchpad has a reflective layer behind the elastic deformable seal so that it forms a dark zone when viewed from the sensor, the size of the dark zone depending on the pressure applied to the touchpad.

Vision sensors are usually located within an opening in a substrate or behind a radiolucent surface without significant optical attenuation, so such a surface is usually made of non-metallic materials. Vision sensors can be equipped with a polarization filter or with a diffusion disk for more uniform illumination in the visible or infrared range.

The image comparison on the basis of light/dark information and/or intensity information of individual pixels of the light-receiving element or on the basis of light information in several colors, preferably RGB colors with a sample image, allows a check of the recorded object.

The task of the invention is to provide an aesthetically pleasing carrier material that can be used in a vision sensor system with a vision sensor.

SUMMARY

The vision sensor system in accordance with the invention, in particular for checking the presence, alignment, features or condition of objects by image comparison, has a vision sensor with a light-receiving element, wherein a light-permeable carrier material with a first surface facing the light-receiving element and located in the beam path of the light-receiving element and a second surface facing away from the light-receiving element and located in the beam path of the light-receiving element is arranged at a distance from the light-receiving element. The carrier material is at least partially light-transmissive as it is lying in the beam path of the light-receiving element and has a at least partially a translucent metallic coating on at least one of the first and second surface located in the beam path of the light receiving element.

Due to the metallic coating of the carrier material, an optically attractive appearance of the carrier material is possible and the vision sensor itself can be installed in a vision sensor system with decorative elements carrying a metallic coating. A metallic coating on a transparent bezel is known from WO 2018/167096, which discloses also a chromium-based reflective coating used in a "hidden til lit" decorative plastic substrate and the translucent effects. The translucent substrate can have a translucent metallic coating on both the first and the second translucent surface. However, a coating on both sides not required.

Preferably, only the second surface which is away from the light receiving element is coated, since every layer of coating reduces light transmission.

Furthermore, a control unit for the light receiving element can be provided, in which the evaluation algorithm for image recognition is executed. The control unit can be part of the same housing where the light receiving element is located. In one constellation with a control unit having a small size, the control unit performs only data conversion from the light receiving element and sends the output signal to another control unit located outside of the vision sensor housing. Another constellation is with a bigger size control unit performing data conversion and recognition computed locally inside the vision sensor housing. In this case, only the final output signal for decision needs to be sent out of the vision sensor system.

It is advantageous that an optical system can be arranged in the beam path of the light receiving element. The optical system helps to determine the blockage of light by human body part when it puts his/her body part on the surface lying in the beam path of the light-receiving element. The optical system can be a part of the light receiving element.

Advantageously, a lighting unit can be provided for illuminating an object arranged in the beam path of the light receiving element. Since the metallic coating attenuates the light, the illuminant in the lighting unit increases the light intensity that can penetrate through the translucent substrate. The lighting unit can improve the light intensity in such a way that the light penetration through translucent substate and the coating remains visible to the light receiving element during day time with intense ambient lighting outside the vision sensor system.

Further, a lighting unit, a control unit and/or an optical system can be arranged in or on a housing. This allows a compact design to be achieved.

In another aspect of the invention, the lighting unit can be included behind the first or second surface, which is located remotely from the light receiving element. In this case, the lighting unit is arranged at a distance on one side of the carrier material and the light receiving element is arranged at a distance on the other side of the carrier material. This allows the use of a light receiving element in a greater distance and covering a wider angle of view.

Advantageously, the light-receiving element can be an image sensor or a distance sensor. An image sensor is full sensor chip, which can perform image recognition, gesture recognition or others and in some cases a distance measurement, if the chip is capable enough to provide distance information such as RGBD camera or ToF camera. The distance sensor provides the distance measurement based on the light reflection from an object. In case, distance measurement is required from either type of sensor, the light generation element and the light receiving element must be part of the same housing in order to performance distance calculation based on the reflection of light on the carrier material on one hand ans on the object on the other hand.

Advantageously, the light receiving element and the control unit can be part of an image sensor and the translucent carrier material can have a translucent metallic coating on at least one of the the first and of the second translucent surface. An image sensor has the advantage that it is capable to perform several functions such as distance measurement, object recognition, gesture recognition and others.

In case the light receiving element is located outside of the housing with the lighting unit and facing towards the lighting unit, the coating of the carrier material should be on the surface facing towards light receiving element. In case the light receiving element and the lighting unit are in the same housing, the coating should be on the surface facing away from the light receiving element.

Advantageously, the light-receiving element is adapted for the detection of light with wavelengths in the visible range between about 380 nm and 780 nm or for light with wavelengths outside the visible range. It is to highlight, that any range of light wavelength can be used depending on the functions, because the light receiving element determines an action based on the blockage of the light in the beam path.

Advantageously, the lighting unit can be designed for light with wavelengths in the visible range with wavelengths between approx. 380 nm and 780 nm or for light with wavelengths outside the visible range, for example infrared light, that it is not visible to human beyond a wavelength of 900 nm. Preferably, an invisible lighting unit can be designed in combination with lighting unit using visible light wavelength for the HMI functions. However, the infrared light in the wavelength between 800 nm and 900 nm can also be used for lighting unit to perform both illumination for the vision sensor and HMI confirmation functions, because this wavelength is usually visible to human eye upto certain extend.

It is advantageous that the carrier material between the first surface and the second surface may have an area of higher light transmission than the surrounding carrier material. Especially in conjunction with the lighting unit, the light intensity that can penetrate through the translucent substrate in these areas is increased. The higher light transmission can be achieved by providing light guides with reflections on the inner side of the outer surface. Any material can be used as the carrier material, which has higher light transmission such as transparent PMMA. In that case there is no need for additional light guide to be included. In another case, where non transparent material is used as carrier material, a light guide could be included in the area where light penetration is required.

Another object of the invention is a method for controlling a vision sensor of a vision sensor system depending on ambient light and based on the light intensity to be received by the light receiving element.

The vision sensor is defined to receive a certain intensity of the light from the lighting unit. The intensity will vary depending on the ambient lighting. During day time operation, the intensity visible to light receiving element is lower due to higher ambient light condition. In that case, the vision system can control the lighting unit to increase the intensity of light emission. During night time, it could reduce the intensity level.

The light generated by lighting unit is mixed with the ambient light during a day time and it varies due to continuous change of light condition due to shades and reflections. Therefore, the light generated by lighting unit should be visible to light receiving element in a way that light receiving element can distinguish between light generated by the lighting unit and ambient light.

This control mechanism could either be based on the fixed value of light intensity to be received by the light receiving element or it could be dynamic based on the intensity level which is good enough to perform operation.

The advantage of fixed value method is that there is no complex calculation required. The control unit keeps increasing the value of light intensity until it reaches a defined threshold value. There is not feedback required to tune lighting unit.

In case of a dynamic value, the control unit needs to process the image and performs the functions. In case, the control unit does not receive a proper image due to darker environment, it needs to provide continous feedback to the control unit to tune the lighting unit as long as the control unit can receive proper image. The advantage is that the lighting unit does not need to operated with higher output all the time, which can result into longer life time of the lighting unit.

A fixed value of light intensity covers all situations which might occur, but the lighting unit would be operated with higher output also in that cases, where a significant lower value of light intensity would be sufficient, for example at nighttime.

To control the production of heat the lighting unit can be switched on and off with the frame rate of the light-receiving element. This is especially useful, if infrared light is used. At daytime, the ambient light of infrared in a car is much darker than outside the car, since the screen blocks infrared light. As a consequence, the lighting unit has to be used, to provide a sufficient light intensity.

BRIEF DESCRIPTION OF THE DRAWINGS

A vision sensor system for recognition of the presence, orientation, characteristics or texture of an object by image comparison is shown in the drawing. It shows

DETAILED DESCRIPTION

Figure 1:
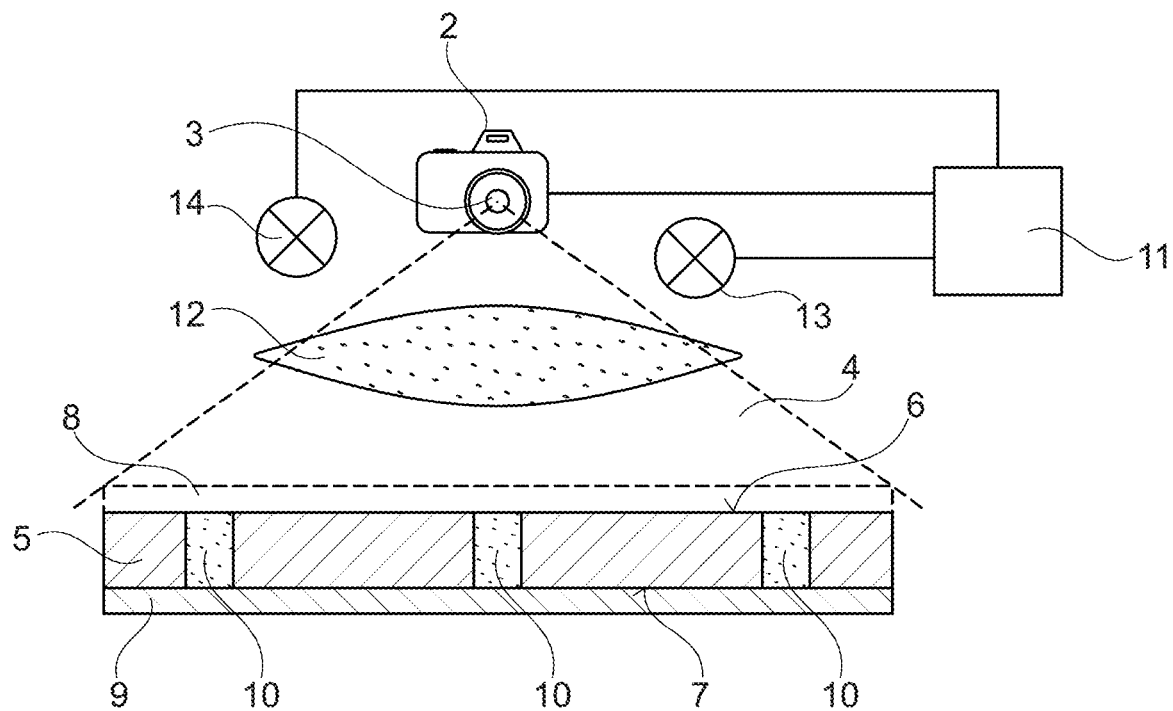
FIG. 1 is a vision sensor system with a vision sensor and a carrier material in plan view.

FIG. 1 shows in plan view a vision sensor system with a vision sensor 1 for recognition of the presence, the orientation, the characteristics or the condition of objects by comparing images. The vision sensor 1 has a housing 2 in which at least one light receiving element 3 is arranged. A translucent carrier material 5 with a first surface 6 facing the light receiving element 3 and a second surface 7 facing away from the light-receiving element 3 is arranged in a beam path 4 of the light receiving element 3. The translucent carrier material 5 is arranged at a distance from the light receiving element 3 and can be connected to the housing 2 or can be part of a housing 17 (FIG. 5). The carrier material 5 can be a transparent cover for the vision sensor 1.

The carrier material 5 has a translucent metallic coating 8, 9 on the first or second surface 6, 7 in the beam path 4 of the light receiving element 3. The coating 8 on the first surface is only indicated, but not present. Several light guides 10 are embedded in the carrier material 5, which extend through the carrier material 5 from the first surface 6 to the second surface 7 and increase the light transmission of the carrier material 5 at least in the areas where the light guides are located. This can be important, because the metallic coating absorbs 8, 9 light. Further, in case of a carrier material 5 which is not translucent, thus which has no light transmission, those light guides are necessary to allow light to arrive at the light receiving element 3 and to avoid an opening in the carrier material 5.

The light receiving element 3 is connected to a control unit 11, in which the signals of the light receiving element 3 are evaluated. The contrast of the signal generated by the light-receiving element 3 allows a recognition. For that purpose, the value of the undisturbed signal is compared to the value of the signal with an object in the beam path blocking light to reach the light receiving element and a threshold of the value is defined.

In the beam path of the light receiving element 3, an optical system 12 is arranged to change the beam path 4, the change itself is not shown. Further, a lighting unit 13, 14 is shown, which is connected to the control unit 11.

Figure 2:
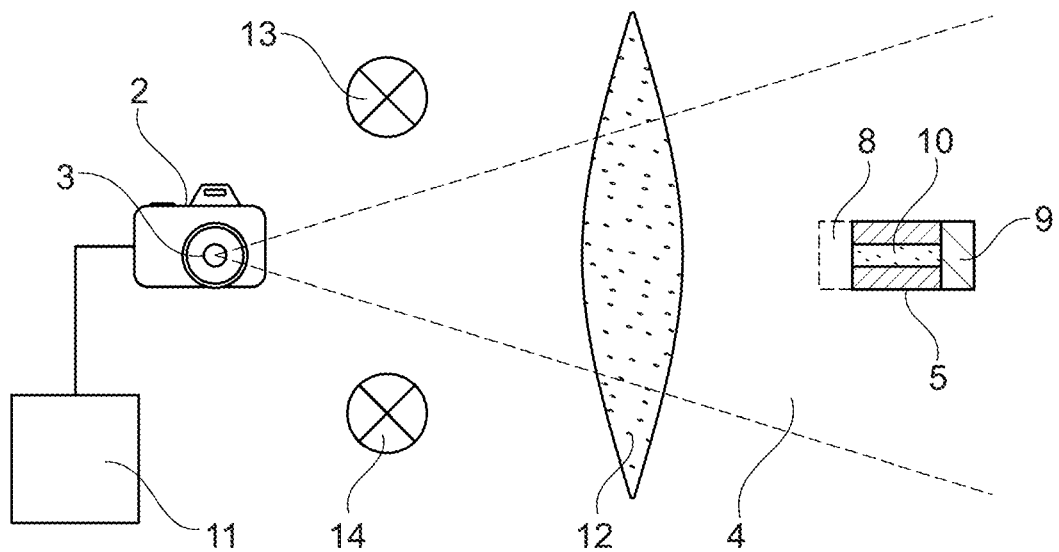
FIG. 2 shows the vision sensor from FIG. 1 in a side view.

FIG. 2 shows the housing 2 with the light receiving element 3 and the control unit 11 in a side view. The light guide 10 is embedded in the surrounding carrier material 5 and is also coated with coating 9. Again, an optical system 12 is provided in the beam path 4 and the lighting unit 13, 14 is shown.

Figure 3:
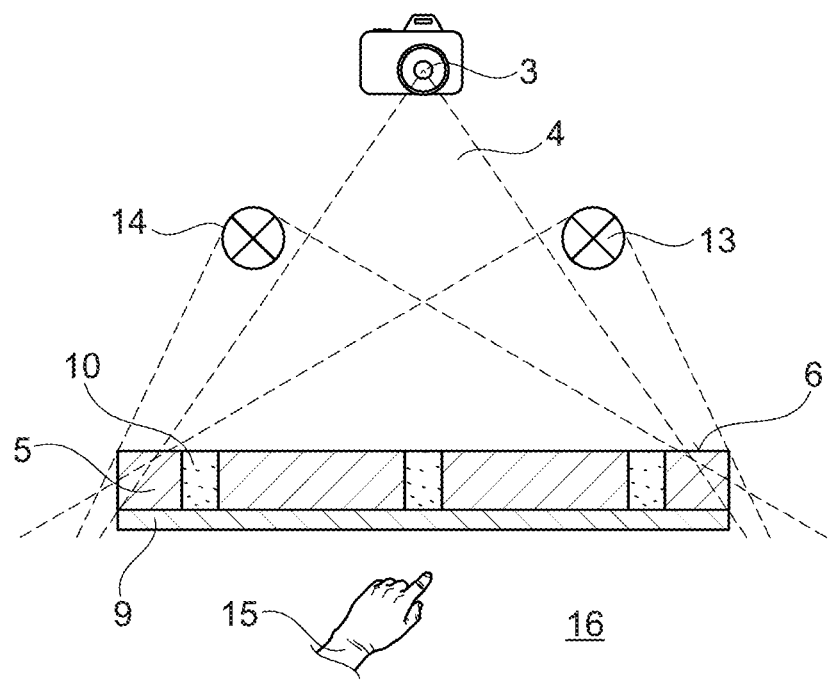
FIG. 3 is the vision sensor from FIGS. 1 and 2 with an object in plan view with object.

In FIG. 3, the vision sensor 1 is shown in a plan view, a lighting unit 13, 14 being provided for illuminating an object 15 arranged in the beam path 4 of the light-receiving element 3, which object 15 is located behind the carrier material 5 in relation to the beam path 4 and which object 15 is exposed to an ambient illumination 16. Thus, the lighting unit 13, 14 and the light-receiving element 3 are located behind a cover formed by the carrier material 5.

The vision sensor 1 can use evaluation algorithms in the control unit 11 to determine from the signals detected by the light receiving element 3 when an object 15, which can also be a person or a part of the body of a person, approaches. In addition, the distance of the object 15 to the light receiving element 3 of the vision sensor 1 can be determined using appropriately designed evaluation algorithms. Also, the distance to the surface 6 or 7 of the carrier material 5 bearing the coating 8, 9 can be determined by an appropriate calibration.

In the proposed arrangement, the vision sensor 1 and light source 13 are placed behind the surface 7 coated with a metallic element. The vision sensor 1 detects that a person with a body part 15 is approaching the surface 7 by detecting the proximity of a body part 15 and calculating its distance from the surface 7 or from vision sensor 1.

Thanks to the determination of the distance to the light-receiving element 3 or the distance to the surface 7 of the substrate 5 carrying the coating 9, a gesture recognition or another control with a human-machine interface (HMI) can take place. As examples, HMI functions such as increasing the light intensity when a hand approaches nearer to the surface 7 or vice versa or increase infotainment volume or vice versa, all are based on distance measurement. Gesture recognition is possible when the the body part 15 moves from one direction to another direction and reflects light to the light-receiving element 3. Based on the speed and direction of blockage of the light guide 10, the control unit 11 can determine the type of gesture.

Figure 4:
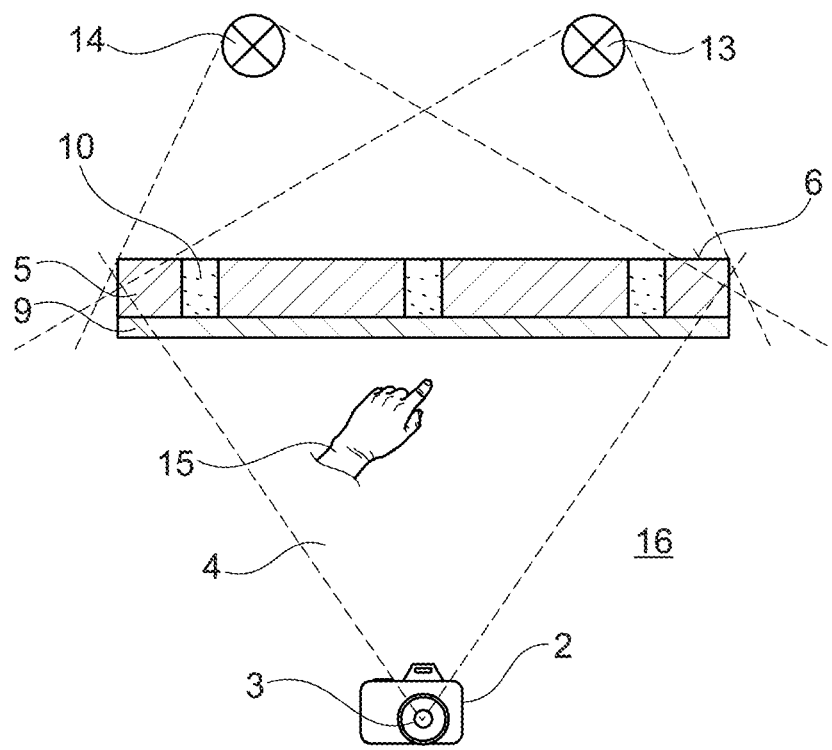
FIG. 4 is another vision sensor with an object in plan view.

In FIG. 4, the vision sensor 1 is shown in a plan view, a lighting unit 13, 14 being provided for illuminating an object 15 arranged in the beam path 4 of the light-receiving element 3, which object 15 is located in front of the carrier material 5 in relation to the lighting unit 13, 14 and which object 15 is exposed to an ambient illumination 16. Thus, the lighting unit 13, 14 are located behind a cover formed by the carrier material 5.

Figure 5A:
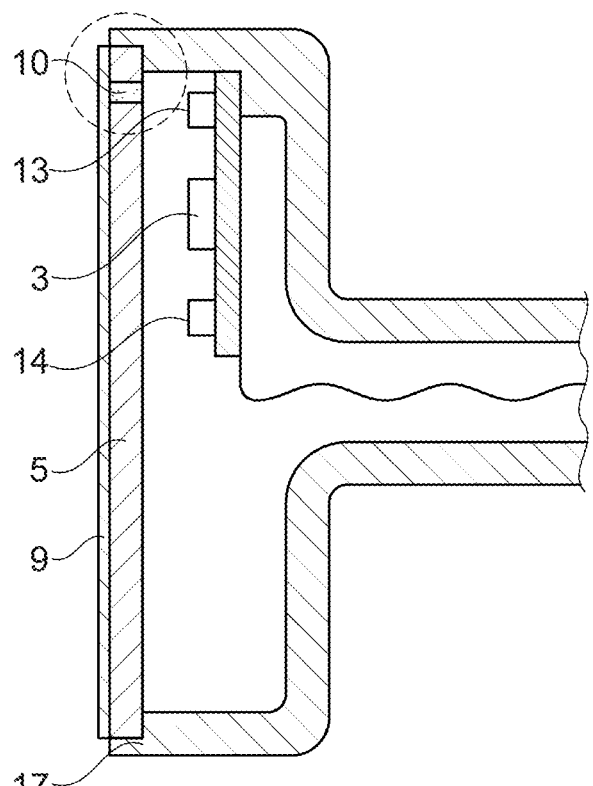
FIG. 5A is the vision sensor from FIG. 1 to 3 as part of a rear view mirror a longitudinal section.
Figure 5B:
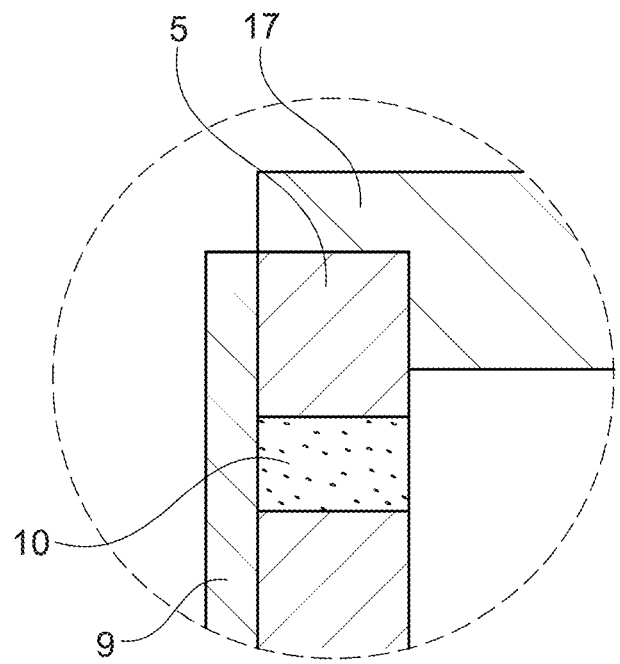
FIG. 5B is a detail of the vision sensor from FIG. 5A.

In FIG. 5A a housing 17 of a rear view mirror is shown, the housing 17 is closed by the carrier material 5 bearing the coating 9. Inside the housing 17 there is a printed circuit board (PCB) with a light-receiving element 3 and lighting unit 13, 14 connected to a control unit (not shown). In the carrier material 5 is a light guide 10, as shown in more detail in FIG. 5B.

This vision sensor system detects a change in light intensity transmitted through the light guide 10 and the coating 9 to the light-receiving element 3.

Preferably, a vision sensor is an image processing system that is optimized for a specific task. The vision sensor captures images, evaluates them with image processing algorithms and then triggers a corresponding reaction.

Vision sensors are specialized in specific fields of application (industry solutions) and are suitable for less complex image processing tasks. They contain interfaces for communication, such as Ethernet, but also 24-volt interfaces suitable for industrial applications for connection to PLCs or pneumatic valves.

A vision sensor typically consists of the following components:
integrated illumination mostly light emitting diodes
integrated lens
an imaging sensor such as a CCD or CMOS sensor and its control
a read-only memory for the firmware and the current sensor parameterization
image and data memory are usually executed as RAM.
a real-time image processor, realized as DSP, CPU, FPGA or as (embedded) PC
application-specific information processing
interface for connection to an external computer mostly USB, Ethernet—rarely FireWire
digital inputs & outputs in 24 V technology for connection e.g. to a PLC.

Preferably, an algorithm is an unambiguous rule of action to solve a problem or a class of problems. Algorithms consist of a finite number of well-defined single steps. This allows them to be implemented in a computer program for execution, but also to be formulated in human language. When solving a problem, a certain input is converted into a certain output.

Preferably, in computer science and electrical engineering, image processing refers to the processing of signals that represent images, such as photographs or individual images from videos. The result of image processing can in turn be an image or a set of features of the input image (see image recognition). In most cases images are regarded as a two-dimensional signal, so that common signal processing methods can be applied. Image processing must be distinguished from image processing, which deals with the manipulation of images for subsequent display.

Preferably, a light-receiving element can be understood as an electronic part, which provides electrons generated upon detection of light (photons) by the electronic part, the output signal depends on the detected quantity and/or quality of the light.

Preferably, a carrier material is a load-bearing material to which a functional layer is applied or inserted.

Preferably, substances may be translucent or opaque. Transparent substances are divided into transparent and translucent substances. The translucency depends not only on the structure of the material, but also on the thickness of the layer.

Preferably, image comparison can be understood in consideration of basic requirements for measuring with image analysis systems, which are:

1. the acquisition of the physical quantity to be measured (length, width, diameter) with an image acquisition sensor (e.g. CCD or CMOS camera)
2. the storage of the image data containing the relevant features in the computer's memory
3. the evaluation of the image content using image evaluation algorithms, i.e. the exact localization of the measuring points and the determination of the distance between the edge locations
4. comparison of the characteristic with a measurement standard known to the system
5. the assignment of a measurement number (calibration factor) to the measurement standard (pixel) and the determination of the measurement result.

Preferably, the alignment means the position of a three-dimensional object in all three spatial axes or the position of the representation of the three-dimensional object in a 2D image of the object.

Preferably, features can be understood as special geometric designs of a component.

Preferably, the quality of a product can be the condition, property, consistency, form, quality, chemical composition.

Preferably, the geometrical course of light beams through optical devices (microscopes, telescopes, projectors, transformers, spectrographs, etc.) is referred to as the beam path. The associated field of expertise is geometrical optics (radiation optics). Simplifying it is assumed that light consists of small particles (photons) that move on straight paths as long as they are not deflected by lenses, mirrors (curved), prisms or other optical components.

Preferably, the following area is referred to as the surface:
between solid and gaseous phases
between liquid and gaseous phases.

Preferably, in manufacturing technology, coating is a main group of manufacturing processes according to DIN 8580 that are used to apply a firmly adhering layer of formless material to the surface of a workpiece. The corresponding process as well as the applied layer itself is also called coating. A coating can be a thin layer or a thick layer as well as several coherent layers, the distinction is not exactly defined and is oriented to the coating process and application purpose. The coating processes differ in the type of coating application in chemical, mechanical, thermal and thermomechanical processes. A usefull metallic coating is disclosed in the WO 2018/167096.

Preferably, metallic has the meaning of consisting of metal, having properties of metal.

Preferably, acontrol units (ECU=electronic control unit or ECM=electronic control module) are electronic modules that are predominantly installed at locations where something has to be controlled or regulated. Control units are used in the automotive sector in all conceivable electronic areas, as well as for the control of machines, systems and other technical processes. They belong to the embedded systems.

Preferably, an optical system includes optical components, optical components and optical devices.

Preferably, the term lighting refers to the generation of light using an artificial light source (lighting system) and the subsequent visualisation of objects that do not illuminate themselves. This artificial light makes people independent of natural light sources and improves visual performance.

Preferably, an illumination leads to an increase of quantity of light energy.

Preferably, a displacement sensor is used to measure the distance between an object and a reference point or changes in length. The change in distance is converted into a standard signal or transmitted to the control unit via a fieldbus. Other terms for this are displacement measuring system, displacement sensor, distance sensor, position sensor or distance sensor.

The electromagnetic spectrum, also known as the electromagnetic wave spectrum, is the totality of all electromagnetic waves of different wavelengths. The light spectrum, also known as the colour spectrum, is the part of the electromagnetic spectrum visible to the human eye. Visible light is the visible part of the electromagnetic spectrum. Most people can perceive wavelengths between about 400 nm and 780 nm with their eyes. This invention is based on light with wavelengths between approx. 380 nm and 780 nm.

Preferably, light with wavelengths outside the visible range is light with wavelengths outside approx. 380 nm and 780 nm.

Preferably, light guides are transparent components such as fibers, tubes or rods that transport light over short or long distances. The light conduction is created by reflection at the boundary surface of the light conduction either
by total reflection due to a lower refractive index of the medium surrounding the light guide, or
by mirroring the boundary surface or
by a suitable refraction gradient.

Preferably, the expression AST Coating is an abbreviation for "advanced surface technology" coating, it has no technically defined content. However, a usefull AST coating system is disclosed in the WO 2018/167096.

Preferably, a Human-Machine-Interface (MMS) or "Man Machine Interface" (MMI) allows the operator under certain circumstances to observe the plant status and to intervene in the process in addition to operating the machine.

Preferably, gesture recognition is the automatic recognition of gestures performed by humans using a computer. A branch of computer science deals with algorithms and mathematical methods for the recognition of gestures and the use of gestures for human-computer interaction. Every posture and body movement can represent a gesture in principle. The most important thing, however, is the recognition of hand and head gestures.

Preferably, the term attenuation is also applied to an attenuating phenomenon that is associated with oscillatory, radiative or wave-like processes, although these are stationary.

In optics, too, the decadic or natural logarithm is common for identification purposes, for example for the attenuating effect of filters the specification as optical density, for optical media the specification of the absorption coefficient.

LIST OF REFERENCE SIGNS

1 vision sensor
2 housing of light receiving element 3 light receiving element
4 beam path
5 carrier material
6 first surface
7 second surface
8 metallic coating
9 metallic coating
10 light guide; area of higher light transmission
11 control unit
12 optical system
13 lighting unit
14 lighting unit
15 object
16 ambient lighting
17 housing of vision sensor system

What is claimed is:

1. A vision sensor system, for recognizing a presence, alignment, features or conditions of objects, comprising:
 a vision sensor with a light-receiving element; and
 a carrier material arranged at a distance from the light-receiving element, the carrier material having a first surface which is located in a beam path of the light-receiving element and facing towards the light-receiving element, the carrier material having a second surface lying in the beam path of the light-receiving element and facing away from the light-receiving element,
 wherein the carrier material is at least partially light-transmissive as it is lying in the beam path of the light-receiving element,
 between the first surface and the second surface the carrier material has an area of higher light transmission than the surrounding carrier material, and
 the carrier material has a light-permeable metallic coating at least partially on at least one of the first and second surface lying in the beam path of the light-receiving element.

2. The vision sensor system according to claim 1, wherein the carrier material comprises a translucent substrate and has a translucent metallic coating as light-permeable metallic coating on the second translucent surface.

3. The vision sensor system according to claim 1, wherein the metallic coating is an AST coating.

4. The vision sensor system according claim 1, further comprising at least one of:
 a control unit for the light-receiving element;
 an optical system arranged in the beam path of the light-receiving element; or
 a lighting unit for illuminating an object arranged in the beam path of the light-receiving element.

5. The vision sensor system according to claim 4, wherein at least one of the lighting unit, the control unit, or the optical system is additionally arranged in or on a housing.

6. The vision sensor system according to claim 4, wherein the lighting unit is arranged at a distance on one side of the carrier material and the light receiving element is arranged at a distance on the other side of the carrier material.

7. The vision sensor system according to claim 1, wherein at least one of:
 the light receiving element is an image sensor or a distance sensor,
 the light-receiving element is adapted for the detection of light with wavelengths in the visible range between about 380 nm and 780 nm or for light with wavelengths outside the visible range, or
 the lighting unit is designed for light with wavelengths in the visible range between approx. 380 nm and 780 nm or for light with wavelengths outside the visible range.

8. The vision sensor system according to claim 1, wherein the carrier material has translucent or opaque substances, with at least one of:
 the translucent substances being transparent, or
 the translucency depending not only on the structure of the material, but also on the thickness of the layer.

9. The vision sensor system according to claim 1, wherein at least one of:
 the area of higher light transmission than the surrounding carrier material comprises a light guide, or
 several light guides are embedded in the carrier material, which extend through the carrier material from the first surface to the second surface.

10. A human-machine interface with at least one vision sensor system according to claim 1.

11. The human-machine interface of claim 10, wherein evaluation algorithms in the control unit are adapted to determine from the signals detected by the light receiving element when an object approaches and/or the distance of the object to the light receiving element, the first surface or the second surface (7).

12. A method for controlling a vision sensor of a vision sensor system according to claim 1, wherein at least one of:
 based on a defined light intensity to be received by the light receiving element the lighting unit increases or reduces the intensity of light emission depending on the ambient lighting,
 the intensity of light emission is controlled based on a fixed value of light intensity to be received by the light receiving element, or
 the intensity of light emission is controlled based on the intensity level which is good enough to perform operation.

* * * * *